June 26, 1928.

J. P. SEAHOLM 1,674,666

CULTIVATOR SHIELD

Filed Nov. 27, 1925   2 Sheets-Sheet 1

Inventor:
John P. Seaholm
By
Atty.

June 26, 1928.
J. P. SEAHOLM
1,674,666
CULTIVATOR SHIELD
Filed Nov. 27, 1925
2 Sheets-Sheet 2
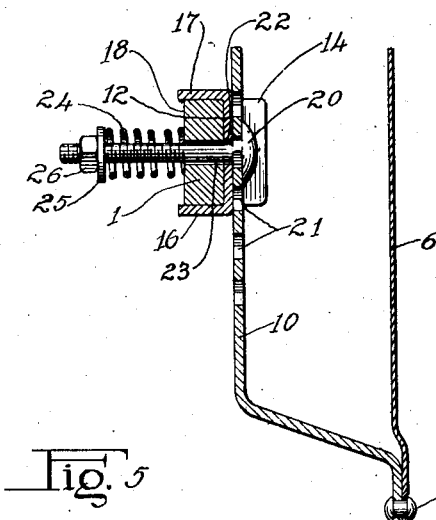
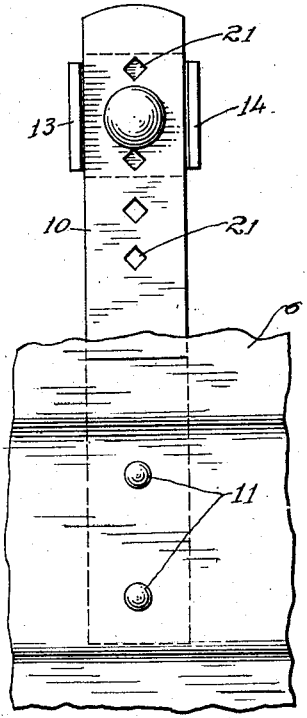
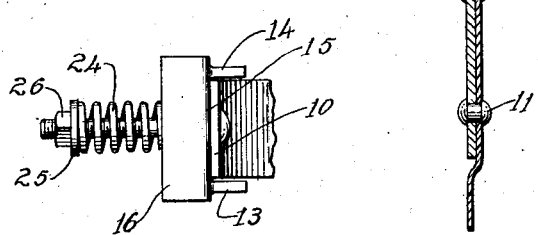
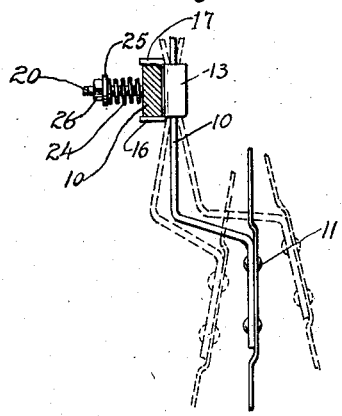
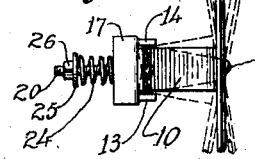
Inventor:
John P. Seaholm
By: L.C. Hints
Atty.

Patented June 26, 1928.

1,674,666

UNITED STATES PATENT OFFICE.

JOHN P. SEAHOLM, OF MOLINE, ILLINOIS, ASSIGNOR TO MOLINE IMPLEMENT COMPANY, OF MOLINE, ILLINOIS, A CORPORATION OF ILLINOIS.

CULTIVATOR SHIELD.

Application filed November 27, 1925. Serial No. 71,729.

The invention relates to a cultivator shield and mounting therefor.

It relates particularly to a shield of the type that is carried by the drag bars of corn cultivators to prevent the dirt stirred up by the cultivator shovels from covering the corn.

Shields of this type must be located toward the rear of the drag bars and near the cultivator shovels in order to intercept the soil as it comes off the shovels. The shield is usually of a thin metal plate positioned relatively close to the ground. When being used, it often strikes large, hard clods of earth or other obstructions which tend to push it to one side or the other or to turn it about its axis. In order to cope with this condition, the shield must be movable in certain directions. It is desirable to have the shield mounted so that its bottom portion can move a limited amount to either side to pass around hard clods or other obstacles. It is also desirable to have it move about a vertical axis so that the front end of the shield can move in or out as it strikes a clod or other obstruction. It is not desirable, however, to have the shield move upward bodily or about a horizontal axis because if it is raised upwardly when it rides over a clod it exposes the corn to the dirt from the shovels.

In order to provide the requisite flexibility of mounting for shields of this type, they have usually been mounted on arms connected to the forward ends of the drag bars. These arms extend rearwardly and carry the shields on their ends. It is difficult to properly secure the shield in this manner and, in addition, the arms interfere more or less with the cultivating operation, detract from the appearance of the cultivator, and require more material for their manufacture than ought to be necessary for the mounting of a simple shield.

The present invention has been devised to provide a simplified mounting which will give the requisite flexibility.

The general object of the invention is to provide an improved cultivator shield mounting.

A more particular object is to provide a cultivator shield mounting in which a short vertical standard is used that is connected to the cultivator drag bar directly adjacent the shield itself.

Other objects and advantages of the invention will hereinafter appear.

The embodiment of the invention is shown in the drawings in which:

Figure 3 is a cross section of the cultivator shield and its mounting.

Figure 4 is a side elevation of the mounting.

Figure 5 is a side elevation of the mounting at right angles to that of Figure 4.

Figure 6 is an end view showing some of the positions of the cultivator shield.

Figure 7 is a plan view showing certain other positions that the cultivator shield will assume.

The shield may be used with any suitable type of cultivator drag bar but it has been illustrated in connection with drag bars made out of flat metal bars 1, 2 and 3 which are connected together and which carry the shovels 4 and handles 5. The use of flat metal bars for making drag bars is quite common in the art and this construction facilitates the attachment of the cultivator shield mounting herein disclosed although the mounting may be used with other types of drag bars.

Figure 1:
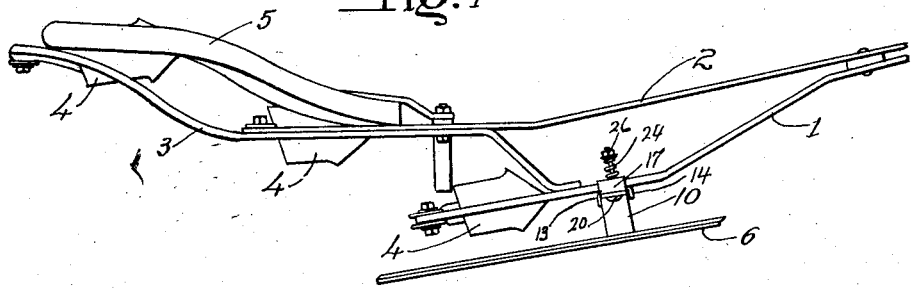
Figure 1 is a plan view of two cultivator drag bars with shields mounted on them.
Figure 2:
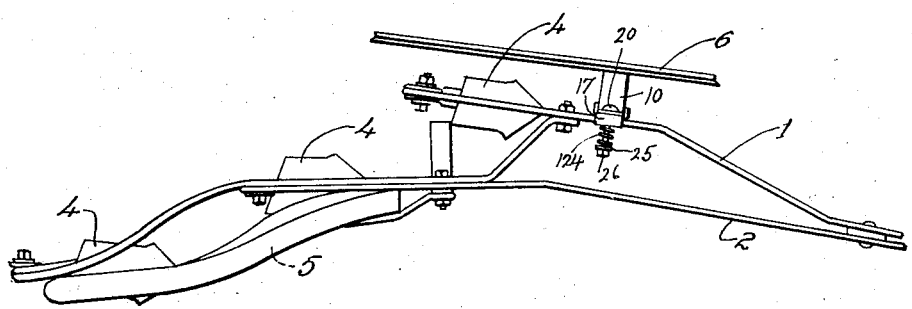
Figure 2 is a side elevation of one of the drag bars shown in Figure 1.
Figure 2:
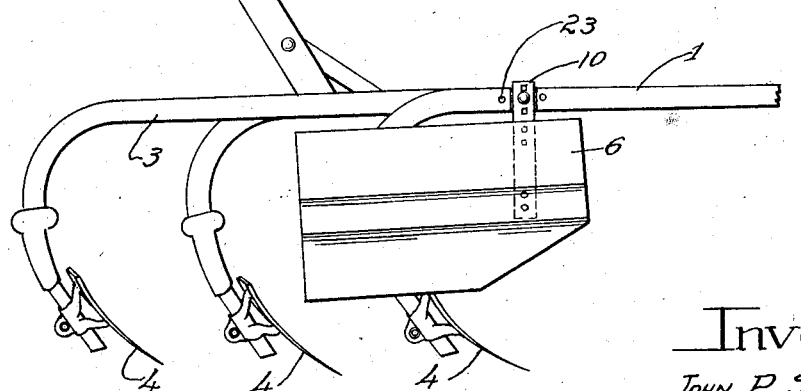

The cultivator shield 6 is a flat metal plate. It is substantially rectangular with its lower corner cut away as shown in Figure 2. The exact size and shape of the shield may be varied. It may be circular, it may be provided with openings, or it may be shaped in any suitable way inasmuch as the mounting herein disclosed does not depend on the shape of the shield.

Instead of mounting the shield on a long arm connected to the front end of the drag bar the shield in the present invention is connected to the drag bar at the point where the shield is located. The required flexibility is obtained by the novel mounting which has been devised.

The shield has a short vertical standard 10 connected to it toward its forward end by rivets 11. This standard is a flat metal bar having an offset bend in it as shown in Figure 3 so as to position the shield in spaced relation to the portion of drag bar to which the standard is connected. Only a relatively small amount of metal is needed for making the standard because it need not be very long since it only extends vertically a short distance and not forward for the full length of the drag bar.

A clamping means is provided for fastening the standard to the drag bar which includes a metal stamping or clip 12 having flanges 13 and 14 stamped from it to form a channel 15 for receiving the standard 10 as illustrated in Fig. 3. The clip also has flanges 16 and 17 stamped from it on the opposite sides to form a channel 18 to receive the drag bar member 1 as shown in Figure 3. The parts are mounted on the drag bar and held together by a bolt 20 which passes through any one of a series of square openings 21 in standard 10 through the openings 22 in the clip 12 and through any one of the openings 23 in the drag bar member 1.

The one bolt thus serves not only to hold the clip in position on the drag bar but also to hold the standard in position in the clip. The holes in the standard 10 are made square to receive a squared portion of the bolt 20 so that the standard will not turn relative to the bolt. A spring 24 is interposed between the drag bar member 1 and the washer 25 bearing against the nut 26 on the end of the bolt. This spring is normally under compression and it serves to yieldingly hold the parts in their normal position.

This mounting prevents the standard from moving vertically up or down relative to the drag bar member and from swinging about the axis of the bolt in a plane parallel to the longitudinal plane of the drag bar. The standard cannot move upward relative to the drag bar because it is bolted to it. It cannot move about the axis of bolt 20 in the vertical plane referred to because the flanges 13 and 14 of the clip prevent it moving relatively to the clip and the flanges 16 and 17 of the clip prevent the clip from moving relative to the drag bar. There should be a little play between the sides of the standard 10 and the flanges 13 and 14 but this is very slight and free movement of the standard 10 on account of this play is prevented by the fact that the square portion of the bolt 20 is in the squared openings in standard 10 so that the standard cannot turn about the bolt. Inasmuch as the bolt holds the standard in frictional contact with the surface of the clip and is in its turn frictionally held against turning by the action of the spring 24, the standard is held quite firmly in position and will not move to take up the slight play that is provided unless the force exerted is very considerable.

The shield may, however, move in a plane transverse to the longitudinal plane of the drag bar as shown in Figure 6. The normal position of the shield is shown in full lines in Figure 6. If the shield strikes a clod or other obstruction which requires that it move to one side, it will move either outwardly or inwardly as shown by the dotted line positions against the action of spring 24 but, as soon as the obstruction has been passed, the spring 24 will bring the shield back to its normal full line position.

The shield may also move about a vertical axis as illustrated in Figure 7. If the front end of the shield strikes an obstruction it may turn out or in as the case may be and the standard 10 will turn against the action of spring 24 which spring will return the standard to its normal position after the obstruction has passed.

These two movements of the shield may be combined, that is, an obstacle may be encountered which first moves only the front end of the shield outwardly and then, as the obstacle is passed, the whole shield is moved outwardly. In other words, there is a movement in any direction except in a plane parallel to the longitudinal axis of the drag bar.

This mounting holds the shield firmly in position because the connection is short and cannot easily get out of adjustment, and at the same time, the shield has the requisite flexibility. The mounting can be inexpensively produced, not only because it is simple but also because it requires a relatively small amount of metal and the manufacturing processes are not complicated.

The structure shown is for the purpose of illustration only and it is to be understood that variations may be made in it without departing from the spirit and scope of the invention as defined by the appended claims.

I claim:

1. The combination with a cultivator drag bar of a cultivator shield having a supporting standard, means for connecting the standard to the drag bar on a substantially horizontal axis including portions for preventing the shield from swinging about the axis of its connection, said means leaving the shield freely movable relative to the drag bar about a vertical axis substantially at right angles to the axis of connection and about a horizontal axis substantially at right angles to the axis of connection, and means for yieldingly preventing movement of the shield which means also acts to return the shield to normal position after it has been moved relative to the drag bar.

2. The combination with a cultivator drag bar of a cultivator shield having a supporting standard, means for connecting the standard to the drag bar on a substantially horizontal axis, said means holding the standard in position by contact with it closely adjacent the axis of connection and including yielding means for maintaining said contact whereby the shield may yieldingly move relative to its connection, and means preventing movement of the shield about its axis of connection in the plain of the shield.

3. The combination with a cultivator drag bar of a cultivator shield having a supporting standard, a bolt extending through the standard and the drag bar and having a head contacting the standard, a spring for urging the bolt head into contact with the standard, and means preventing the standard from swinging about the axis of the bolt while leaving it free to move in other directions against the tension of the spring pressed bolt.

4. The combination with a cultivator drag bar of a cultivator shield having a supporting standard, a connecting member having one channel portion for receiving the drag bar and another channel portion substantially at right angles to the first for receiving the standard, a bolt extending through the standard, the connecting member and the drag bar, and a spring between the end of the bolt and the drag bar for yieldingly holding the parts together.

5. A cultivator shield mounting comprising a standard of rectangular cross section, a metal clip embracing two edges and one side of said standard and being shaped to embrace two edges and a side of a drag bar of rectangular section positioned at right angles to the standard, a bolt extending through the clip, the standard and the drag bar for holding the parts together, the opening in the clip being larger than the bolt, and a spring between a stop on the bolt and the standard.

In testimony whereof, I affix my signature.

JOHN P. SEAHOLM.